United States Patent
Medalsy et al.

(10) Patent No.: US 11,325,310 B2
(45) Date of Patent: May 10, 2022

(54) OPTIMIZING PRINT SPEED AND ORIENTATION FOR 3D PRINTING BASED ON MULTISCALE CONVOLUTIONS

(71) Applicant: NEXA3D INC., Ventura, CA (US)

(72) Inventors: Izhar Medalsy, Ventura, CA (US); Itay Barel, Santa Barbara, CA (US)

(73) Assignee: NEXA3D INC., Ventura, CA (US)

( * ) Notice: Subject to any disclaimer, the term of this patent is extended or adjusted under 35 U.S.C. 154(b) by 200 days.

(21) Appl. No.: 15/929,463

(22) Filed: May 4, 2020

(65) Prior Publication Data
US 2020/0353687 A1    Nov. 12, 2020

Related U.S. Application Data

(60) Provisional application No. 62/845,784, filed on May 9, 2019.

(51) Int. Cl.
| | |
|---|---|
| B29C 64/386 | (2017.01) |
| G05B 13/02 | (2006.01) |
| B29C 64/124 | (2017.01) |
| B33Y 50/00 | (2015.01) |
| G06F 30/20 | (2020.01) |
| B33Y 10/00 | (2015.01) |
| G06F 113/10 | (2020.01) |

(52) U.S. Cl.
CPC .......... *B29C 64/386* (2017.08); *B29C 64/124* (2017.08); *B33Y 10/00* (2014.12); *B33Y 50/00* (2014.12); *G05B 13/024* (2013.01); *G06F 30/20* (2020.01); *G06F 2113/10* (2020.01)

(58) Field of Classification Search
CPC .. B29C 64/386; B29C 64/124; G06F 2113/10
See application file for complete search history.

(56) References Cited

U.S. PATENT DOCUMENTS

| | | | | |
|---|---|---|---|---|
| 2006/0054039 A1* | 3/2006 | Kritchman | ............ | B29C 64/106 101/424.1 |
| 2008/0121130 A1* | 5/2008 | Kritchman | .............. | B29C 41/02 101/485 |
| 2015/0134095 A1* | 5/2015 | Hemani | ................ | B29C 64/386 700/98 |
| 2018/0186092 A1* | 7/2018 | Nordback | .............. | B33Y 50/02 |

\* cited by examiner

*Primary Examiner* — Nathan T Leong
(74) *Attorney, Agent, or Firm* — Ascenda Law Group, PC

(57) ABSTRACT

An optimal printing speed and orientation for an object to be manufactured using an additive manufacturing process in which a photo-curable resin is cured through exposure to radiation are estimated by determining, for pixel maps defining cross-sections of the object, a critical size of a convolution kernel which provides an activation map having a maximum activation pixel value less than or equal to a predetermined threshold value. For each respective pixel map, a printing time is estimated as a function of an adjusted base lift velocity and base lift height of the printing apparatus. The optimal printing speed and orientation are then estimated as a minimum value of a function of the printing times for all respective pixel maps of the cross-sections of the object at each of a plurality of possible orientations of the object.

1 Claim, 4 Drawing Sheets

OPTIMIZING PRINT SPEED AND ORIENTATION FOR 3D PRINTING BASED ON MULTISCALE CONVOLUTIONS

RELATED APPLICATIONS

This is a NONPROVISIONAL of, claims priority to, and incorporates by reference U.S. Provisional Application No. 62/845,784, filed May 9, 2019.

FIELD OF THE INVENTION

The present invention relates to an additive manufacturing processes in which a photo-curable resin is cured through exposure to radiation when fabricating an object, and in particular to optimizations in printing speed and orientation of an object under fabrication by such method.

BACKGROUND

Within the field of additive manufacturing, so-called three-dimensional printing, or 3D printing, by means of photo-curing a viscous, liquid resin (typically a liquid polymer) layer-by-layer to form a desired object has become very popular. Within this field, it is known that aspects of the quality of the object under fabrication are sensitive to printing speed. Printing speed (or, more generally, manufacturing time) is dependent upon the speed of polymerization of the photo-curable resin (e.g., under exposure to UV light), but for a given resin it is also dependent upon the orientation of the object under fabrication.

SUMMARY OF THE INVENTION

The present invention concerns determining an optimal printing speed and orientation for an object to be manufactured using an additive manufacturing process in which a photo-curable resin is cured through exposure to radiation. In one embodiment of the invention, the optimal printing speed and orientation are so arrived at by first determining, for each pixel map that defines a cross-section of the object to be fabricated, a critical size of a convolution kernel for which convolving the convolution kernel with the pixel map provides an activation map having a maximum activation pixel value less than or equal to a predetermined threshold value. The pixel maps of the cross-sections of the object to be fabricated are ranked relative to one another according to their respective critical sizes of convolution kernels. For each respective pixel map of the cross-sections of the object to be fabricated, a printing time is estimated as a function of an adjusted base lift velocity and base lift height of an extractor plate of a printing apparatus within which the additive manufacturing process is performed, where the base lift velocity and base lift height are so adjusted according to a parameter derived from the respective critical size of the convolution kernel of the respective pixel map. The optimal printing speed and orientation for the object are estimated as a minimum value of a function of the printing times for all respective pixel maps of the cross-sections of the object at each of a plurality of possible orientations of the object, where the function of the printing times includes a term proportional to a rate of change of local density of the pixel maps as a function of slice number.

DETAILED DESCRIPTION

In the following description of embodiments of the invention, reference is made to the accompanying drawings that form a part hereof, and in which are shown by way of illustration specific embodiments in and by which the invention may be practiced. It should be understood that other embodiments may be realized based on the teachings presented herein without departing from the scope of the present invention. Description associated with any one of the figures may be applied to a different figure containing like or similar components.

Figure 1:
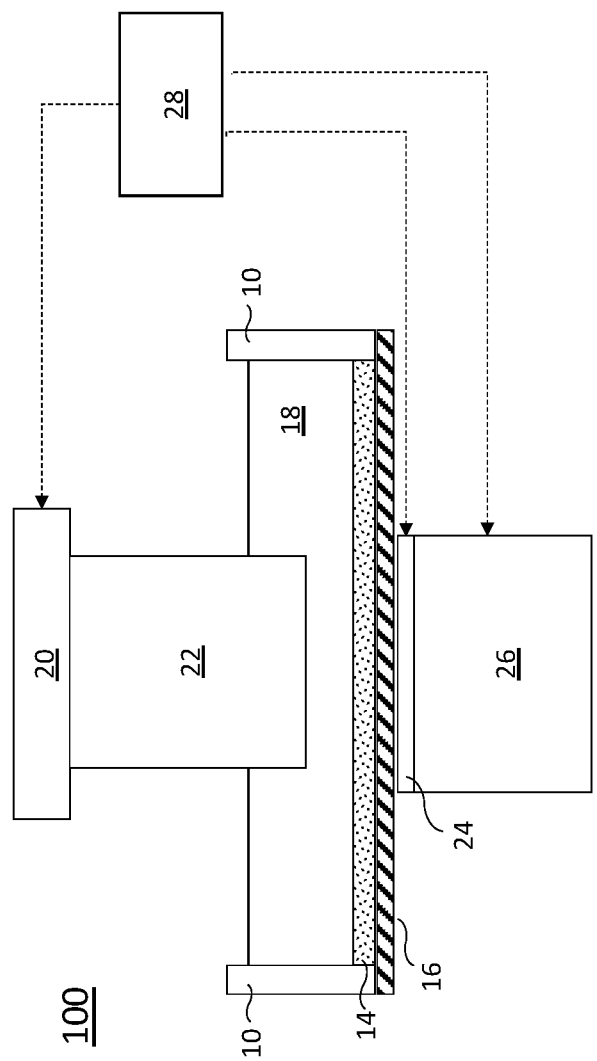
FIG. 1 depicts a schematic cross-section of a 3D printing system in which an object undergoes fabrication in a tank containing a photo-curing liquid resin, in accordance with one embodiment of the invention.

FIG. 1 depicts a cross-section of 3D printing system 100, in which electromagnetic radiation (e.g., ultra-violet ("UV") light) is used to cure a photo-curing liquid resin (typically a liquid polymer) 18 in order to fabricate an object (e.g., a 3D object) 22. Object 22 may be fabricated layer by layer (i.e., a new layer of object may be formed by photo-curing a layer of liquid polymer 18 adjacent to the bottom surface of object), and as each new layer is formed the object may be raised by extractor plate 20, allowing a next layer of photo-curing liquid resin 18 to be drawn under the newly formed layer. This process may be repeated multiple times to form additional layers until fabrication of the object is complete.

The 3D printing system 100 may include tank 10 for containing the photo-curing liquid resin 18. The bottom of tank 10 (or at least a portion thereof) is sealed (i.e., to prevent the photo-curing liquid polymer 18 from leaking out of tank 10) by a flexible membrane 14, which is transparent (or nearly so) at wavelengths of interest for curing of the resin to allow electromagnetic radiation from a light source 26 to enter into tank 10. A mask 24 (e.g., a liquid crystal layer) may be disposed between light source 26 and the photo-curing liquid resin 18 to allow the selective curing of the liquid resin (which allows the formation of 3D object into intricate shapes/patterns). In various embodiments, collimation and diffusion elements such as lenses, reflectors, filters, and/or films may be positioned between mask 24 and light source 26. These elements are not shown in the illustrations so as not to unnecessarily obscure the drawings.

One challenge faced by 3D printing systems of the kind illustrated in FIG. 1 is that in addition to adhering to the object, the newly formed layers have a tendency to adhere to the bottom of tank. This is an undesirable situation as a newly formed layer could tear off from the remainder of the object of which it is a part when the extractor plate (and, hence, the object) is raised. To address this issue, the flexible membrane 14 (which may but need not necessarily be a self-lubricating membrane) is disposed at, and in this example forms, the bottom of tank 10 (or at least a portion thereof). The flexible membrane 14 may be formed of silicone or other flexible material, and may, in some instances, be enriched or coated with polytetrafluoroethylene (PTFE) to further increase its "non-stick" quality.

A platen or backing member 16 disposed between the mask 24 and the flexible membrane 14 provides structural support, and is also transparent (or nearly so) at the one or more wavelengths of interest for curing the resin. Such a platen may be formed of borosilicate glass or other material. In other instances, platen 16 may be metal or plastic and include a transparent window to allow electromagnetic radiation from light source 26 to enter into tank 10. In other embodiments, the mask 24 itself may be used in place of a separate window and its perimeter sealed with a gasket. Note that although the mask 24, platen 16, and membrane 14 are shown as being displaced from one another by some distance, in practice these components may be positioned so as to touch one another, so as to prevent refraction at any air interfaces. Flexible membrane 14 is secured to the edges of tank 10 or to a replaceable cartridge assembly (not shown) so as to maintain a liquid-tight perimeter at the edges of the tank or other opening ("liquid-tight" meaning that the tank does not leak during normal use).

Preferably, during printing operations the membrane 14 is maintained under biaxial strain over its longitudinal and transverse extents. By keeping the membrane under biaxial strain, the membrane exhibits a tendency to maintain its shape in a plane defining the bottom of the tank. This is useful because as the extraction plate, and, hence, the object under construction, is raised during the printing process, so too is the membrane deformed in the direction of the rising extraction plate. This is because the polymer resin is very viscous and there is an absence of air (i.e., a vacuum or partial vacuum) between the newly-formed layer of the object under construction and the membrane. Consequently, as that newly-formed layer rises (as a result of the raising of the extraction plate), the membrane is drawn upwards (i.e., flexes) in an area immediately beneath the newly-formed layer. The tension imparted in the membrane, however, causes the membrane to gradually peel away from the newly-formed layer of the object and return to its original, planar position. This gradual separation of the membrane and the newly-formed layer of the object reduces mechanical stresses on the newly-formed polymer layer, thereby reducing the risk of that layer tearing away from the previously-formed portions of the object under construction.

When fabricating a layer of object 22 using 3D printing system 100, electromagnetic radiation is emitted from radiation source 26 through mask 24, platen 16, and membrane 14 into tank 10. The electromagnetic radiation may form an image on an image plane adjacent the bottom of object 22. Areas of high (or moderate) intensity within the image may cause curing of localized regions of the photo-curing liquid resin 18. The newly cured layer adheres to the former bottom surface of object 22 and substantially does not adhere to the bottom surface of tank 10 due to the presence of flexible membrane 14. After the newly cured layer has been formed, the emission of electromagnetic radiation may temporarily be suspended (or not, in the case of "continuous printing") while the extraction plate 20 is raised away from the bottom of the tank so that another new layer of object 22 may be printed.

Figure 2:
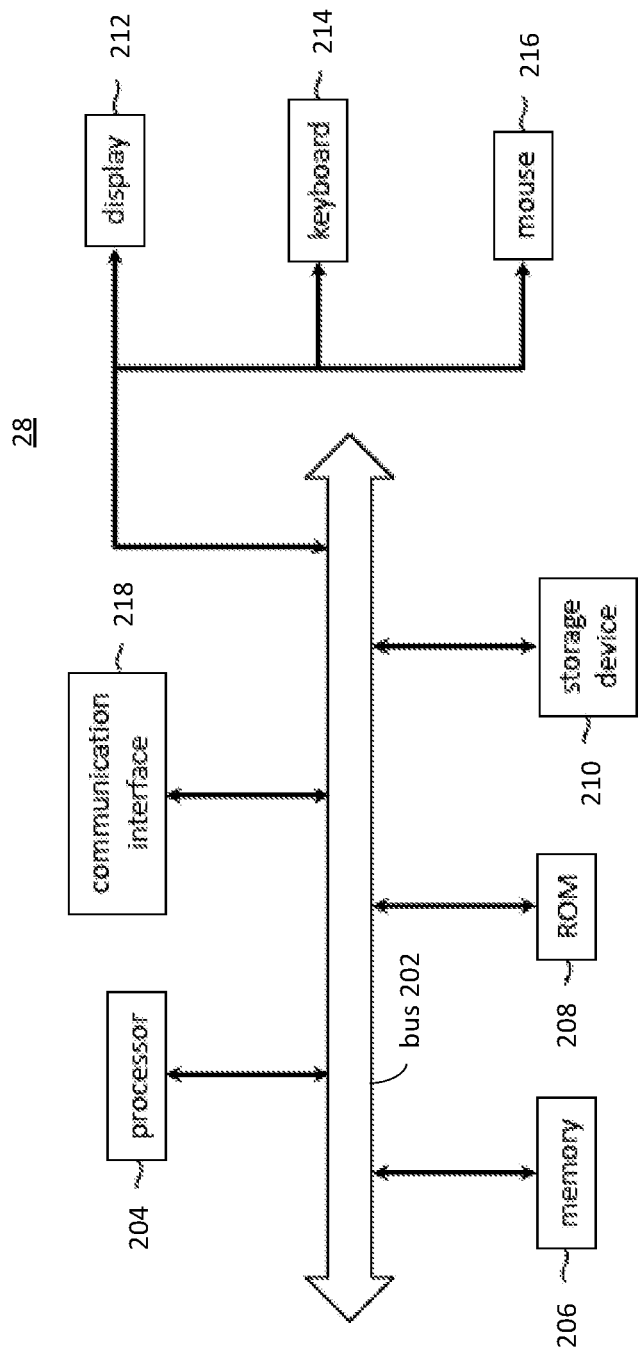
FIG. 2 depicts an example of a controller for the 3D printing system illustrated in FIG. 1, in accordance with one embodiment of the invention.

Aspects of the printing process are directed by a controller 28, which may be implemented as a processor-based system with a processor-readable storage medium having processor-executable instructions stored thereon so that when the processor executes those instructions it performs operations to cause the actions described above. For example, among other things controller 28 may instruct raising/lowering of the extraction plate 20, activation and deactivation of the light source 26, and the projection of cross-sectional images of the object under fabrication via mask 24 (e.g., as determined by the optimizations for the printing process described below). FIG. 2 provides an example of such a controller 28, but not all such controllers need have all of the features of controller 28. For example, certain controllers may not include a display inasmuch as the display function may be provided by a client computer communicatively coupled to the controller or a display function may be unnecessary. Such details are not critical to the present invention.

Controller 28 includes a bus 202 or other communication mechanism for communicating information, and a processor 204 (e.g., a microprocessor) coupled with the bus 202 for processing information. Controller 28 also includes a main memory 206, such as a random access memory (RAM) or other dynamic storage device, coupled to the bus 202 for storing information and instructions to be executed by processor 204. Main memory 206 also may be used for storing temporary variables or other intermediate information during execution of instructions to be executed by processor 204. Controller 28 further includes a read only memory (ROM) 208 or other static storage device coupled to the bus 302 for storing static information and instructions for the processor 204. A storage device 210, for example a hard disk, flash memory-based storage medium, or other storage medium from which processor 204 can read, is provided and coupled to the bus 202 for storing information and instructions (e.g., operating systems, applications programs and the like).

Controller 28 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackpad, or similar input device for communicating direction information and command selections to processor 204 and for controlling cursor movement on the display 212. Other user interface devices, such as microphones, speakers, etc. are not shown in detail but may be involved with the receipt of user input and/or presentation of output.

The processes referred to herein may be implemented by processor 204 executing appropriate sequences of computer-readable instructions contained in main memory 206. Such instructions may be read into main memory 206 from another computer-readable medium, such as storage device 210, and execution of the sequences of instructions contained in the main memory 206 causes the processor 204 to perform the associated actions. In alternative embodiments, hard-wired circuitry or firmware-controlled processing units may be used in place of or in combination with processor 204 and its associated computer software instructions to implement the invention. The processor-readable instructions may be rendered in any computer software language.

In general, all of the process descriptions mentioned herein are meant to encompass any series of logical steps performed in a sequence to accomplish a given purpose, which is the hallmark of any processor-executable application. Unless specifically stated otherwise, it should be appreciated that throughout the description of the present invention, use of terms such as "processing," "computing," "calculating," "determining," "displaying," "receiving," "transmitting," or the like, refer to the action and processes of an appropriately programmed controller, such as controller 28 or similar electronic computing device, that manipulates and transforms data represented as physical (electronic)

quantities within its registers and memories into other data similarly represented as physical quantities within its memories or registers or other such information storage, transmission or display devices.

Controller 28 also includes a communication interface 218 coupled to the bus 202. Communication interface 218 may provide a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that controller 28 can send and receive messages and data through the communication interface 218 and in that way communicate with hosts accessible via the Internet. It is noted that the components of controller 28 may be located in a single device or located in a plurality of physically and/or geographically distributed devices.

As noted above, printing speed, that is, manufacturing time, for an object 22 is dependent upon the speed of polymerization of the photo-curable resin 18 under exposure to UV light from light source 26, but for a given resin it is also dependent upon the orientation of the object under fabrication. As a simple example, consider the manufacture of a cylinder with a hollow core of diameter d and an outer diameter of D, the cylinder therefore having a wall thickness of (D−d)/2, and length L. If the cylinder is printed with its long axis vertical, that is parallel to the direction of motion of extraction plate 20, it will be fabricated as a series of concentric rings, one on top of the other. The time to print the cylinder will be a function of its length L and the thickness of a single ring. On the other hand, if the cylinder is printed with its long axis horizontal, that is orthogonal to the direction of motion of the extraction plate, it will be fabricated as a series of rectangular shaped items of different widths layered on top of one another, and the printing speed will be a function of the diameter D and the thicknesses of the different layers. Printing at orientations between the vertical and horizontal will entail different printing times that may need to account for the manufacture support structures (scaffolds) to support the cylinder as part of the overall process.

The present invention is concerned with determining an optimal orientation for an object 22 to be manufactured using an apparatus similar to that explained with reference to FIG. 1 in which electromagnetic radiation, e.g., UV light from light source 26, is used to cure a photo-curing liquid resin 18 in a tank to fabricate, layer by layer, the object. This optimum orientation for fabrication is associated with an optimal printing speed for the object. To determine the optimal printing speed and orientation, in one embodiment of the invention a convolutional neural network (CNN) is employed.

As is known in the art, a CNN is an algorithm that can take as inputs images, assign importance to aspects of the images, and differentiate among them. Often, CNNs are employed as tools to "recognize" (more specifically, assign probabilities to) objects depicted in images. In the present invention, however, a CNN is employed to identify convolution kernels that produce accurate rankings of cross-sections (or "slices") of an object to be printed in terms of their local densities. The CNN may be instantiated on the controller 28 or in a remote, processor-based system. The CNN is implemented with one or more convolutional layers and a plurality of fully-connected layers. Where multiple convolutional layers are employed, maximum, average, or minimum pooling may be used.

Often, for example when used for machine vision or similar tasks, a CNN will receive images as inputs. In embodiments of the present invention, the input images are pixel maps for the LCD mask 24. The pixel maps define cross-sections, or "slices" of the object under fabrication and allow or not, on a pixel-by-pixel basis, UV light from light source 26 to irradiate the resin 18 in tank 10. Where UV light is permitted through the mask, a volume (or "voxel") of resin corresponding to the associated pixel in the pixel map will be cured, and where UV light is blocked by the pixel map, no such curing will occur. As each successive layer is formed through curing, the supporting plate 20 is raised, allowing the immediate successive layers (slices) to form adjacent one another. Blank pixels represent areas where UV light will pass through the mask to cure an associated voxel of the respective slice of the object. Opaque pixels represent areas where no UV light will pass through the mask, so no voxel of the slice is cured. Each pixel in the slice may have a value according to its opacity between (typically) 0-255 (or 0-1 if a normalization of the values is performed).

The convolutional layers of the CNN are used to assess a length (volume) scale for local density of each pixel map (slice). Local density at each pixel in a slice is estimated using a convolution kernel ω as follows:

$$g(x, y) = \omega(s, t) * f(x, y) = \sum_{s=-a}^{a} \sum_{t=-b}^{b} \omega(s, t) f(x - s, y - t),$$

where g(x,y) is the resulting filtered "image" (often called an activation map), f(x,y) is the original "image" (i.e., the pixel map of the slice of the object to be printed), and the kernel ω is a box blur (i.e., a spatial domain linear filter of the form $(ab)^{-1} 1_{ab}$, with $1_{ab}$ being a kernel of size a×b in which all elements are 1). In other embodiments of the invention, different forms of convolution kernels may be employed, for example a Gaussian blur. With the box blur as the convolution kernel, each pixel in the activation map is the average of itself and its neighbors in the source image, f(x,y).

The convolution ω(s,t)*f(x,y) is performed for different convolution kernel sizes. Increasing the kernel size includes more pixels in the computed average of the activation map. For a sufficiently large kernel, the result in the activation map for each pixel (i.e., the result g(x,y) of the convolution) will be lower than a predefined threshold. That is, the kernel size will be such that there are no areas of the original pixel map f(x,y) that are so dense (i.e., have so many associated blank pixels) as to completely fit within the kernel area. The corresponding kernel size for this condition is deemed a critical size, $(s_c, t_c)$, and is associated with the highest local density of the slice, α, where α is the area (s×t) of the kernel. For example, if $(s_c, t_c) = (3,3)$, α=9; if $(s_c, t_c) = (5,5)$, α=25; and so on.

Figure 3:
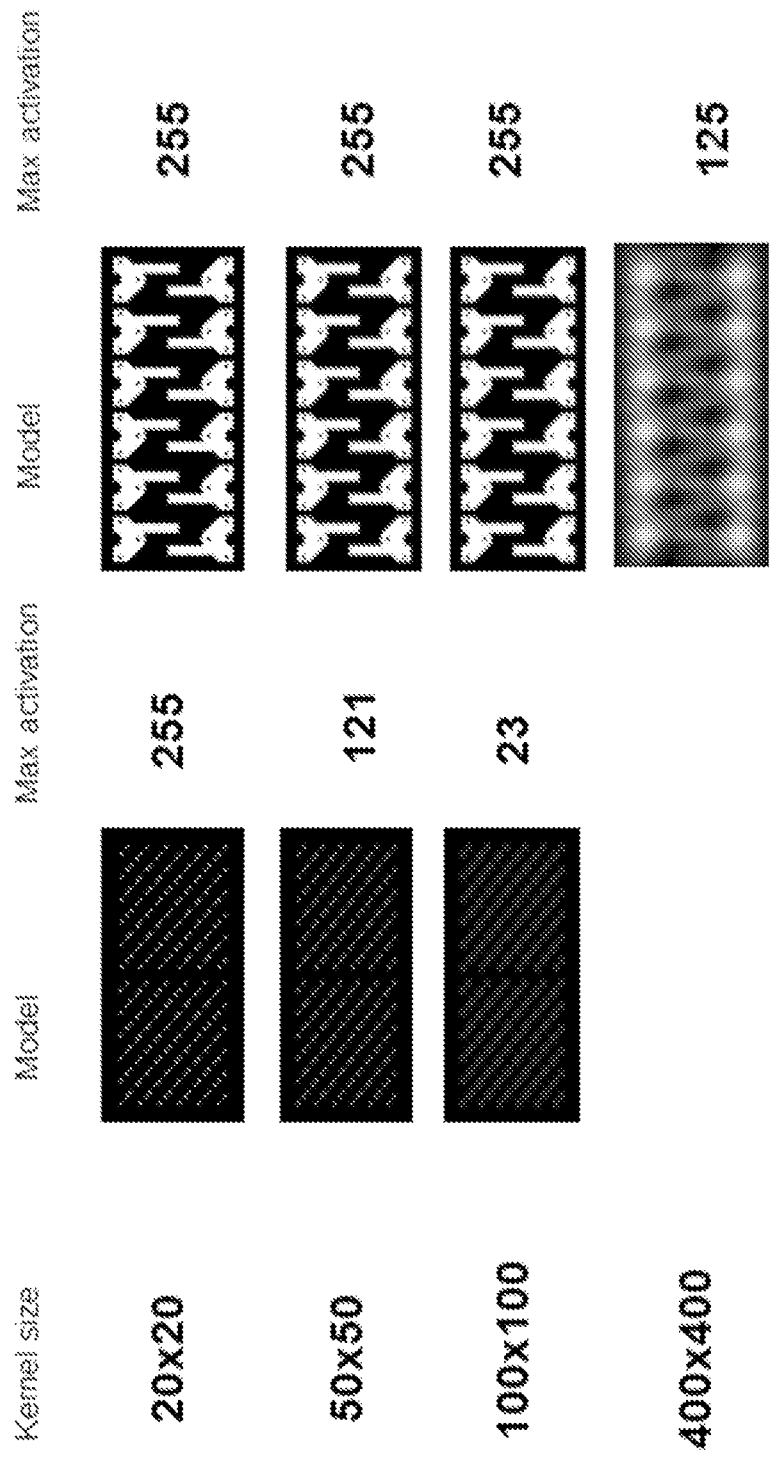
FIG. 3 provides visual examples of convolving object slices with different sizes of convolution kernels in accordance with embodiments of the present invention.

FIG. 3 provides examples of convolving object slices with different sizes of convolution kernels. On the left-hand side of the figure, a slice composed of very small areas of blank pixels arranged in a grid-like fashion is shown. Intuitively, this is a slice of very low local density inasmuch as it represents a portion of the object to be printed with only small features arranged in the grid-like fashion. In contrast, on the right-hand side of the illustration a slice composed of very large areas of blank pixels, indicative of a rather dense slice, is shown. For each slice, which in practice may be 4K pixel maps, the results of convolutions with different kernel sizes is presented.

For a 20×20 kernel, the left-hand image produced an activation map with at least some pixels remaining at a value of 255. This indicates that there were at least some features to be printed that were equal to or larger than a 20×20 kernel. The same was true for the slice on the right-hand side of the image. However, by the time the kernel size was increased to 50×50, the left-hand image produced an activation map with no pixels that remained at the maximum value of 255. Instead, the maximum pixel value of the activation map was 121. For a 100×100 convolution kernel, the maximum pixel value of the activation map for the left-hand image was 23. For the right-hand image, however, not until the convolution kernel was increased to 400×400 did the activation map include pixel values below the maximum value of 255. Notice that the blurring effect caused by the use of such a large kernel is very apparent in the corresponding right-hand image. Also, although these examples reference kernels having square aspect ratios (i.e., equal numbers of pixels in both dimensions), in practice kernels of other aspect ratios may be used. For example, when the pixel maps for the object slices have aspect ratios that are rectangular, with length dimensions having different numbers of pixels than width dimensions, kernels with similar aspect ratios may be employed.

While FIG. 3 provides a visual illustration of the effect of using convolution kernels of different sizes, it does not necessarily specify the critical size of a convolution kernel for the respective slices. The critical size depends on a specified threshold value and, in practice, that threshold value may be determined empirically or it may be set somewhat arbitrarily at a value near zero. Irrespective of the specified threshold value that defines a critical size kernel, the slices (that is, the pixel maps for the slices) that make up the object are ranked with respect to one another according to the estimates of their largest feature size—i.e., according to the areas of their respective critical size kernels.

Figure 4:
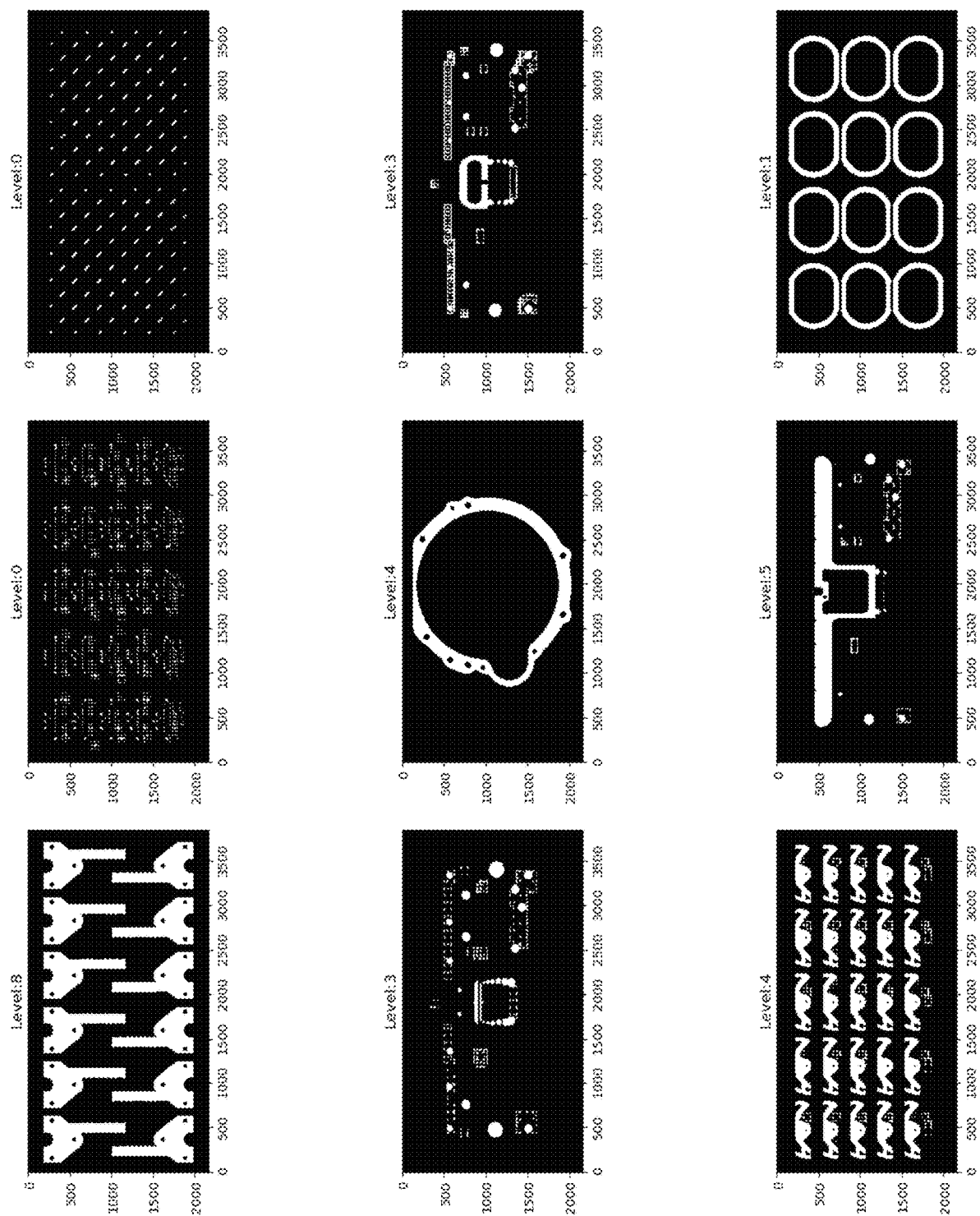
FIG. 4 illustrates examples of slices ranked according to their respective local densities in accordance with embodiments of the invention.

This ranking can be regarded as a kind of normalization of the areas of the respective critical size kernels with respect to the smallest critical size kernel for all of the slices which make up the object to be fabricated. For example, if the lowest critical size kernel for the slices of the object was a (4,4) kernel, then all slices for which the critical size kernel was (4,4) may have a ranking of 0, representing the least dense slices. Slices for which the critical size kernel was (5,5) may have a ranking of 1, representing slices with greater density, and so on. In one embodiment, rankings from 0-9 are employed and the CNN may be trained (e.g., using feedback provided by human experts and/or automatically) to identify kernels that will produce accurate rankings. FIG. 4 illustrates examples of slices ranked according to their respective local densities in accordance with embodiments of the invention. A ranking of 0 indicates slices that have an associated fastest printing speed for the subject object, while a ranking of 9 indicates slices that have an associated slowest printing speed therefor.

The parameter a is used to produce the printing parameters for the slice under consideration, where the higher the critical kernel size, the greater the value of a and the slower the printing speed. In particular, $$\hat{L} \sim \alpha^{-\gamma} L_0, \text{ and}$$

$$\hat{H} \sim \alpha^{\gamma} H_0,$$

where $L_0$ and $H_0$ are the base lift velocity and lift height of extractor plate 20, respectively, $\hat{L}$ and $\hat{H}$ are the adjusted lift velocity and lift height of extractor plate 20, and $\gamma$ is an empirically determined constant. The base lift height, that is the vertical displacement of the extractor plate 20 from slice-to-slice, and base lift velocity are resin-dependent parameters and may also depend on temperature. In practice, base lift height, base lift velocity and $\gamma$ may be specified on a per-device, per-resin basis, for example by a manufacturer of a printing apparatus such as that illustrated in FIG. 1. In other cases, it may be determined empirically by a user through manufacture of objects that have different geometries.

As explained above, printing times will vary according to the orientation at which the object is printed. So, to obtain the most efficient orientation (in terms of printing speed), the print time per slice may be represented as:

$$\tau = \frac{\hat{H}(\alpha)}{\hat{L}(\alpha)} + C$$

where C is a constant that accommodates the exposure time for the resin being used and the retract speed.

The optimal printing time is given by the minimum value of $T(\varphi, \alpha)$, where $$T(\varphi, \alpha) = \sum_{i=1}^{l(\varphi)} \tau_i$$

where T is the total print time and $l(\varphi)$ is the number of slices, which depends on the object's orientation $\varphi$.

For a given orientation of an object to be fabricated, abrupt changes in local density may represent areas where stresses can accumulate, resulting in the object's failure. Therefore, the above expression for T ($\varphi$, $\alpha$) may be modified (or regularized) by a term proportional to the rate of change of local density as a function of slice number (which is proportional to the "z" location—that is the dimension of the object along the axis of the displacement of the extraction plate), $$\frac{d\alpha}{dz},$$

to obtain a function which will optimize both print speed and object quality:

$$T(\varphi, \alpha) = \sum_{i=1}^{l(\varphi)} \tau_i + \beta \frac{d\alpha_i}{dz}$$

where, $\beta$ is a resin-dependent constant that penalizes configurations which cause abrupt changes in local densities between slices. Higher values of $\beta$ provide objects with preferable mechanical properties at the expense of printing speed. Specific values of $\beta$ may be determined empirically or, over time, may be published for given resins.

In addition to the above, dilation algorithms may be used (e.g., in combination with the orientation algorithms described above) to determine a best part population/distribution in a slice to maximize printing speed. In this context, part population is a description of how elements of a slice are laid out on a pixel map of a slice or, viewed differently, how they are fabricated on the extraction plate of the printing apparatus.

Thus, optimizations for printing speed and orientation in an additive manufacturing process in which a photo-curable resin is cured through exposure to radiation when fabricating an object have been described.

What is claimed is:

1. A method of estimating an optimal printing speed and orientation for an object to be fabricated in an additive manufacturing process in which a photo-curable resin is cured through exposure to radiation, said method comprising:

for each pixel map that defines a cross-section of the object to be fabricated, determining a critical size of a convolution kernel for which convolving the convolution kernel with the pixel map provides an activation map having a maximum activation pixel value less than or equal to a predetermined threshold value;

ranking all of the pixel maps of the cross-sections of the object to be fabricated relative to one another according to their respective critical sizes of convolution kernels;

estimating for each respective pixel map of the cross-sections of the object to be fabricated a printing time as a function of an adjusted base lift velocity and base lift height of an extractor plate of a printing apparatus within which the additive manufacturing process is performed, said base lift velocity and base lift height adjusted according to a parameter derived from the respective critical size of the convolution kernel of the respective pixel map; and estimating the optimal printing speed and orientation for the object as a minimum value of a function of the printing times for all respective pixel maps of the cross-sections of the object at each of a plurality of possible orientations of the object, wherein the function of the printing times includes a term proportional to a rate of change of local density of the pixel maps as a function of slice number.

* * * * *